INVENTOR.
ALFREDS ROZENTALS

INVENTOR.
ALFREDS ROZENTALS
BY Davis, Hoxie, Faithfull
+ Hapgood
ATTORNEYS

United States Patent Office 3,103,059
Patented Sept. 10, 1963

3,103,059
METHOD AND APPARATUS FOR ASSEMBLING ROLLING ELEMENTS IN ANTIFRICTION BEARINGS
Alfreds Rozentals, Fairfield, Conn., assignor, by mesne assignments, to Universal Bearing Corporation, Fairfield, Conn., a corporation of Delaware
Filed July 3, 1959, Ser. No. 824,827
6 Claims. (Cl. 29—148.4)

My invention relates to an apparatus and a process for loading rolling elements in antifriction bearings, more particularly bearings having telescoped members with rolling elements between them.

It is directed to the need for a simple, dependable and flexible apparatus for placing rolling elements in such bearings. Apparatus in current general use is needlessly cumbersome to manufacture and to operate. It is subject to human error as to accuracy of placement. It is not sufficiently flexible for the needs of the wide variety of manufacturing processes currently used, and it is especially inflexible for such processes as that described in Lewis R. Heim's United States Patent No. 2,910,765 granted November 3, 1959.

My invention provides positive and exact placement of rolling elements in any kind of telescoped bearings. I provide a base on which the outer member is mounted, a ball distributor capable of entering the outer member in telescoped relation with it and of moving longitudinally within the outer member to distribute rolling elements at any point along its length, means for causing relative rotation of the distributor and the member with respect to each other, and means for subjecting the rolling elements to pressure to force them into place.

Figure 1:
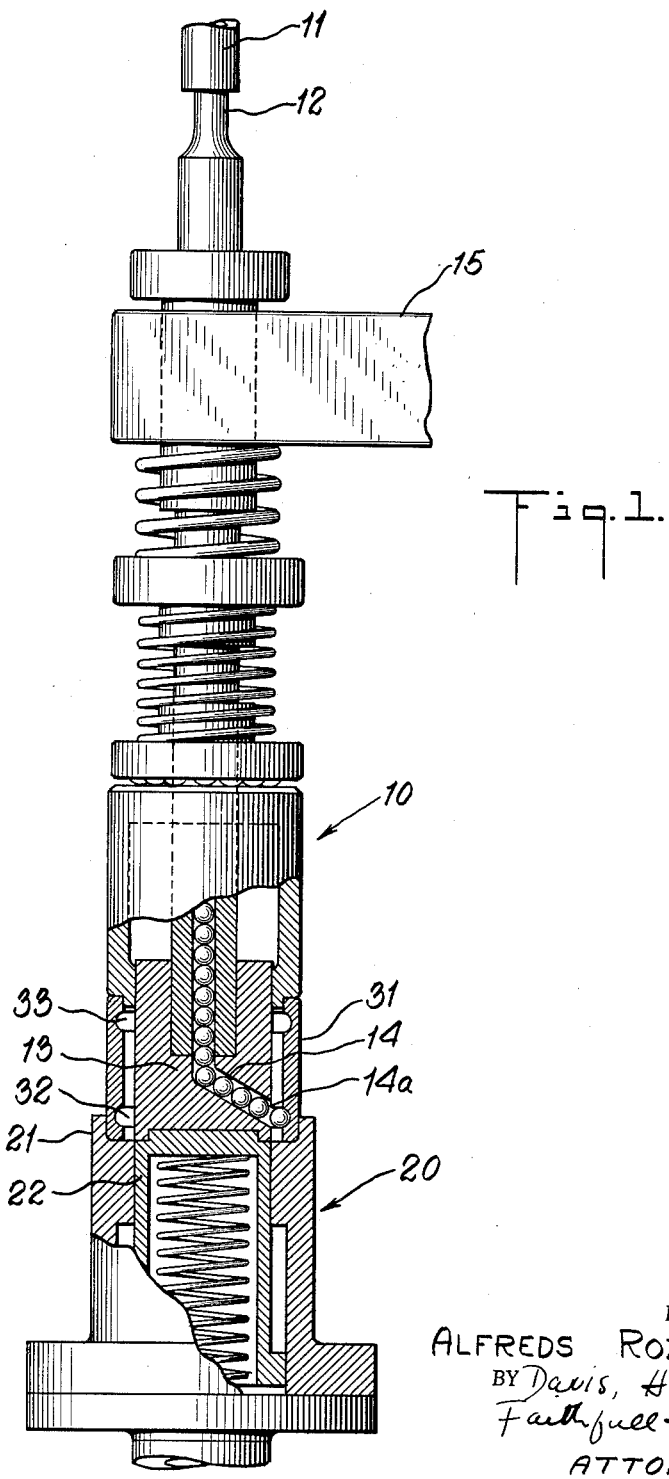
Figure 2:
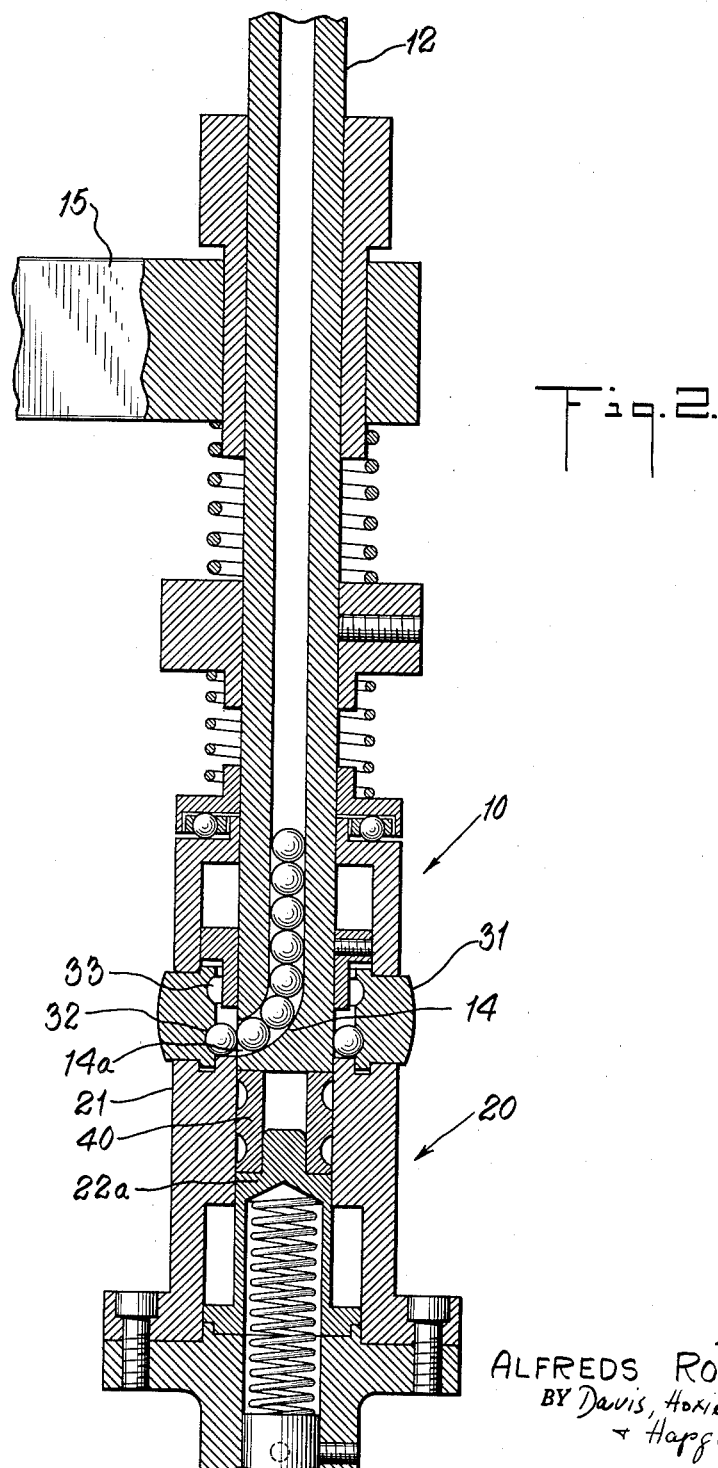

In the drawings FIGS. 1 and 2 each show by way of example an elevation view, partially in section, of a different embodiment of my invention. The embodiment of FIG. 1, which is used for loading a double row bearing with balls, has an upper portion 10 and a lower portion 20. The upper portion 10 has a flexible tube 11 of slightly greater inside diameter than the balls to be loaded. The upper end of the tube 11 is attached to a source of compressed air and the lower end is attached to and empties into a rigid tube 12. The opposite end of the tube 12 is attached to and empties into a ball distributor 13. The ball distributor 13 has a channel 14 extending from the point where the balls enter it from the tube 13 to a point 14a on the outer surface of the distributor 13 immediately above the bottom of the distributor 13. The distributor 13 is attached to a member 15 which is mounted so that it can be moved up and down either by hand or by any of a number of well known means for causing automatic reciprocating motion.

The lower portion 20 has a rotating base 21. Within the base 21 is a member 22, equal in diameter to the ball distributor 13, mounted so that it can be moved up and down either by hand or by any of a number of well known means for causing automatic reciprocating motion.

In operation the balls are placed in the tube 11 below the compressed air source. A continuous supply of balls is mounted in the tube 11. When the upper portion 10 is in its raised position (not shown) a double row outer member 31 of an antifriction bearing of the telescope type, having lower and upper races 32 and 33, respectively, is placed on the rotating base 21. The distributor 13 then descends, pushing the member 22 downward ahead of it, until the outer end of channel 14 is opposite the lower race 32, whereupon balls under pressure are forced into the race 32. The distributor 13 is maintained in that position long enough to allow the member 31 to rotate on the base 21 and the distributor to discharge balls all round the inside of the member 31 until the race 32 has a full complement of balls. Timing can be done by the operator or by any of a number of well known time delay devices. The distributor 13 is then pushed upward by the member 22 until the outer end of channel 14 is opposite the upper race 33 and the balls are forced into race 33 as described in connection with race 32. The proper positions for the distributor can be controlled by stops for hand operation or, in the case of automatic operation, by any of a number of well known automatic means for controlling position of a reciprocating member.

The distributor 13 is then pushed further upward by the member 22, this time to a position where it is out of contact with the member 31. The upper portion 10 is then raised to its original position and an inner double row member (not shown) is placed on the member 22 and pushed downward, pushing member 22 downward ahead of it until the races of the inner member are opposite the corresponding races of the outer member.

In the embodiment of FIG. 2, an inner member 40 is placed on a member 22a, similar to the member 22, prior to loading. The descent of the distributor, as described above, then causes the inner member 40 to be pushed downward into the rotating base 21. After loading is completed the member 22a pushes the member 40 upward to complete the assembly of the bearing.

I claim:

1. A process of placing rolling elements in a telescoped antifriction bearing having an inner member and an outer member with a race in its inner wall, including causing a rolling element distributor to enter the outer member in the absence of the inner member and to discharge rolling elements against the inner wall of the outer member at a point adjacent to the race, rotating the outer member and holding the rolling elements against the race as they are discharged until a full circle of rolling elements has been discharged and held against the outer member, simultaneously causing the rolling element distributor to move out of the outer member and causing the inner member to enter the outer member and to pass within the circle of rolling elements whereby the members are assembled by the insertion of the inner member within the outer member with the rolling elements between the members to form a unitary bearing during withdrawal of the distributor from the outer member.

2. A process as claimed in claim 1 in which the inner member is placed within the outer member prior to loading and is then displaced by the distributor for the loading operation after which the inner member displaces the distributor.

3. A rolling element distributor for antifriction bearings having telescoped ring-like members with grooves in their adjacent walls and a circle of rolling elements in the grooves, comprising a right circular cylinder substantially equal in diameter to the inner part of the circle of rolling elements when they are in the grooves of the outer member, said cylinder having a tubular passage extending from one end of the cylinder to a point on the outer circular wall of the cylinder, whereby the cylinder can be inserted within the outer member in telescoped relation with it and rotated with respect to the outer member and the rolling elements can enter the cylinder at one end and emerge from it at the circular wall and enter the groove of the outer member, and whereby the rolling elements can be held in the groove of the outer member by the circular wall of the cylinder as it rotates with respect to the outer member and whereby the members can be assembled by inserting the inner member within the outer member with the rolling elements between the members to form a unitary bearing after withdrawal of the cylinder from the outer member.

4. Apparatus for loading rolling elements in a telescoped antifriction bearing having an inner member with an outer raceway and a ring-like outer member with an inner raceway and rolling elements between the two members, including a shelf-like pedestal support for the outer member, a rolling element distributor as a portion of the apparatus adjacent to the support, the distributor member having an internal channel with an entrance port and an exit port on its exterior of about the size of a single rolling element for the passage of the rolling elements, the distributor being substantially cylindrical in form, being of a size to hold the rolling elements in said raceway of said outer member, and being capable of moving into the outer member in telescoped relation with the outer member in the absence of the inner member and of moving longitudinally within the outer member, and means for causing relative rotation of the member and the distributor with respect to each other, whereby the distributor discharges rolling elements all around the inner wall of the outer member and the distributor holds the rolling elements in the said raceway of said outer member.

5. Apparatus as set forth in claim 4 in which the distributor is subjected to air pressure to increase the force causing the rolling elements to leave the distributor.

6. Apparatus as set forth in claim 4 having a shaft substantially equal in diameter to the outer diameter of the inner member, capable of pushing the distributor out of the outer member after the distributor has completed the discharge of rolling elements.

References Cited in the file of this patent

UNITED STATES PATENTS

| | | |
|---|---|---|
| 1,031,589 | Russell | July 2, 1912 |
| 1,080,169 | Reed | Dec. 2, 1913 |
| 1,401,680 | Dlesk | Dec. 27, 1921 |
| 1,758,653 | Cramer | May 13, 1930 |
| 2,311,251 | Rees | Feb. 16, 1943 |
| 2,407,409 | Farries | Sept. 10, 1946 |
| 2,783,528 | Menne | Mar. 5, 1957 |